(12) United States Patent
Doumani

(10) Patent No.: US 10,144,074 B2
(45) Date of Patent: Dec. 4, 2018

(54) RECIPROCATING TOOL WITH LINEAR BALL RAILS

(71) Applicant: Nanjing Chervon Industry Co., Ltd., Nanjing (CN)

(72) Inventor: Robert Doumani, Hoffman Estates, IL (US)

(73) Assignee: Nanjing Chervon Indusrty Co., Ltd., Nanjing (CN)

( * ) Notice: Subject to any disclaimer, the term of this patent is extended or adjusted under 35 U.S.C. 154(b) by 121 days.

(21) Appl. No.: 15/338,567

(22) Filed: Oct. 31, 2016

(65) Prior Publication Data

US 2018/0117688 A1    May 3, 2018

(51) Int. Cl.
*B23D 51/16* (2006.01)
*B23D 49/10* (2006.01)

(52) U.S. Cl.
CPC ............. *B23D 51/16* (2013.01); *B23D 49/10* (2013.01)

(58) Field of Classification Search
CPC ................................ B23D 51/16; B23D 49/10
USPC .......................................................... 30/392
See application file for complete search history.

(56) References Cited

U.S. PATENT DOCUMENTS

| | | | | |
|---|---|---|---|---|
| 2,738,812 A * | 3/1956 | Waddell | ................. | B23D 51/10 30/392 |
| 3,494,390 A * | 2/1970 | Dudek | ................. | B23D 49/167 30/394 |
| 3,665,983 A * | 5/1972 | Wagner | ................. | B23D 49/167 30/376 |
| 3,729,822 A * | 5/1973 | Batson | ................. | B23D 49/167 30/394 |
| 5,697,158 A * | 12/1997 | Klinzing | ............ | A61B 17/1624 30/166.3 |
| 6,212,781 B1 * | 4/2001 | Marinkovich | ......... | B23D 51/16 30/394 |
| 6,249,979 B1 * | 6/2001 | Bednar | ................. | B23D 49/165 30/182 |
| 7,325,315 B2 * | 2/2008 | Bigden | ................. | B23D 49/167 279/77 |
| 7,448,137 B2 * | 11/2008 | Neitzell | ............... | B23D 49/165 30/392 |
| 7,797,841 B2 | 9/2010 | Moreno | | |
| 8,205,342 B2 * | 6/2012 | Doumani | ............. | B23D 49/167 30/392 |
| 8,621,967 B2 * | 1/2014 | Doumani | ............. | B23D 49/167 30/392 |
| 2010/0154231 A1 | 6/2010 | Doumani | | |

(Continued)

*Primary Examiner* — Hwei C Payer

(74) *Attorney, Agent, or Firm* — Greenberg Traurig, LLP

(57) ABSTRACT

In accordance with one embodiment, a reciprocating saw includes a housing, a spindle shaft configured to reciprocate within the housing, the spindle shaft including a plurality of first grooves extending along an axis of the spindle shaft, a locking bushing including an internal bore, the locking bushing supported by the housing such that the plurality of first grooves is at least partially located within the internal bore, the locking bushing including a plurality of axially extending grooves within the internal bore, each of the plurality of axially extending grooves aligned with a respective one of the plurality of first grooves, and a plurality of first ball bearings, each of the plurality of first ball bearings positioned at least partially within a respective one of the plurality of axially extending grooves and the aligned respective one of the plurality of first grooves.

21 Claims, 3 Drawing Sheets

(56) References Cited

U.S. PATENT DOCUMENTS

2011/0247847 A1    10/2011   Holmes et al.
2018/0117688 A1*   5/2018   Doumani ............... B23D 51/16

* cited by examiner

RECIPROCATING TOOL WITH LINEAR BALL RAILS

FIELD

This disclosure relates to power hand tools and more specifically to reciprocating power hand tools.

BACKGROUND

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner. Various approaches have been developed which translate the rotational motion into reciprocating motion. A common approach is the incorporation of a wobble plate drive.

A "wobble plate" assembly is a configuration wherein a shaft has an angled portion on which an arm is mounted through a ball bearing assembly. The arm is slidingly positioned within a portion of a plunger assembly. As the angled portion of the shaft rotates, the arm translates the rotation of the shaft into a reciprocating movement of the plunger assembly. One example of a reciprocating tool which incorporates a wobble plate drive is U.S. Patent Publication No. 2011/0247847, which was published on Oct. 13, 2011, the entire contents of which are herein incorporated by reference.

As the plunger assembly moves along an axis, a significant amount of momentum is created. All of this momentum is absorbed by the tool as the plunger assembly reverses direction. Thus, a user of a reciprocating tool incorporating a wobble plate drive must contend with a powerfully vibrating device. In order to make such reciprocating tools more controllable, reciprocating tools such as the device in the '847 patent publication incorporate a counterweight which is driven by a secondary wobble plate in a direction opposite to the direction of the plunger assembly. In order to function properly, the housing enclosing the counterweight must be large enough to allow for travel of the counterweight without touching other components. Thus, while the incorporation of a secondary wobble plate and counterweight is effective, such systems can be bulky and expensive.

Moreover, the counterweight in known devices is guided by two rods. One of the rods provides primarily for guiding and aligning (eliminating the X and Y rotational degrees of freedom). The other rod is the secondary for anti-rotation (eliminating the Z rotation degree of freedom). By using the two rods, the counter balance is only allowed to slide in the X direction. Such a device is disclosed in the '847 patent publication.

The guide rods slide inside and are supported by guide bushings within the counterweight. There are manufacturing variations in bushing sizes and alignment, however, which cause higher friction in the sliding mechanism, generating additional non-desirable heat buildup. The heat affects efficiency and reduces the life of the mechanism.

A need exists for a reciprocating tool which reduces vibration or rotation of a wobble plate drive while reducing production of heat. A further need exists for a reciprocating tool which reduces vibration or rotation of a wobble plate drive which does not rely upon bulky assemblies. A system which reduces vibrations or rotation in a reciprocating tool while reducing costs associated with vibration reduction would be further beneficial. A system which reduces the overall size of a reciprocating tool so that it is portable and convenient to use without sacrificing the performance.

SUMMARY

In one embodiment, a reciprocating saw includes a housing, a spindle shaft configured to reciprocate within the housing, the spindle shaft including a plurality of first grooves extending along an axis of the spindle shaft, a locking bushing including an internal bore, the locking bushing supported by the housing such that the plurality of first grooves is at least partially located within the internal bore, the locking bushing including a plurality of axially extending grooves within the internal bore, each of the plurality of axially extending grooves aligned with a respective one of the plurality of first grooves, and a plurality of first ball bearings, each of the plurality of first ball bearings positioned at least partially within a respective one of the plurality of axially extending grooves and the aligned respective one of the plurality of first grooves.

In one or more embodiments, the spindle shaft is selectively rotatable within the housing.

In one or more embodiments, a reciprocating saw includes a locking mechanism rotationally fixed with respect to the housing, the locking mechanism movable between a first position whereat the locking mechanism engages the locking bushing to preclude rotation of the locking bushing, and a second position whereat the locking mechanism does not preclude rotation of the locking bushing.

In one or more embodiments, the locking mechanism includes an axially extending tab, and the locking bushing includes a plurality of splines, each of the plurality splines alternatively alignable with the tab such that the tab can engage each of the plurality splines at a rotational position of the spindle shaft different from a rotational position of the spindle shaft at which the tab engages each of the other of the plurality of spines.

In one or more embodiments, the locking mechanism includes a button rotationally fixed with respect to the housing and movable between a third position and a fourth position, the fourth position radially outwardly of the first position, wherein the tab extends rearwardly from a body portion of the button.

In one or more embodiments, a reciprocating saw includes a plurality of second grooves in the spindle shaft extending along the axis of the spindle shaft, each of the plurality of second grooves aligned with a respective one of the axially extending grooves, and a plurality of second ball bearings, each of the plurality of second ball bearings positioned at least partially within a respective one of the plurality of axially extending grooves and the aligned respective one of the plurality of second grooves.

In one or more embodiments, each of the plurality of second grooves is aligned with a respective one of the plurality of first grooves.

In one or more embodiments, a method of operating a reciprocating saw includes reciprocating at least a portion of a spindle shaft within a housing, and guiding the reciprocating spindle shaft with a first plurality of ball bearings, each of the first plurality of ball bearings positioned at least partially within (i) a respective one of a plurality of axially extending grooves in a locking bushing, and (ii) a respective one of a plurality of first grooves extending along an axis of the spindle shaft.

In one or more embodiments, a method of operating a reciprocating saw includes selectively rotating the spindle shaft within the housing.

In one or more embodiments, selectively rotating the spindle shaft within the housing includes rotating the locking bushing with respect to the housing, and transferring rotational force from the locking bushing to the spindle shaft through the first plurality of ball bearings.

In one or more embodiments, a method of operating a reciprocating saw includes moving a locking mechanism rotationally fixed with respect to the housing, from a first position whereat the locking mechanism engages the locking bushing to preclude rotation of the locking bushing, to a second position whereat the locking mechanism does not preclude rotation of the locking bushing prior to selectively rotating the spindle shaft.

In one or more embodiments, a method of operating a reciprocating saw includes aligning one of a plurality of splines of the locking bushing with an axially extending tab of the locking mechanism by the selective rotation of the spindle shaft, and moving the locking mechanism from the second position to the first position.

In one or more embodiments, moving the locking mechanism from the second position to the first position includes moving a button rotationally fixed with respect to the housing and movable between a third position and a fourth position, the fourth position radially outwardly of the third position, from the third position to the fourth position.

In one or more embodiments, a method of operating a reciprocating saw includes guiding the reciprocating spindle shaft with a second plurality of ball bearings, each of the second plurality of ball bearings positioned at least partially within (i) a respective one of the plurality of axially extending grooves in the locking bushing, and (ii) a respective one of a plurality of second grooves extending along the axis of the spindle shaft.

In one or more embodiments, a method of operating a reciprocating saw includes preventing rotation of a wobble configured to reciprocate the spindle shaft using the first and second plurality of ball bearings.

DESCRIPTION

Figure 1:
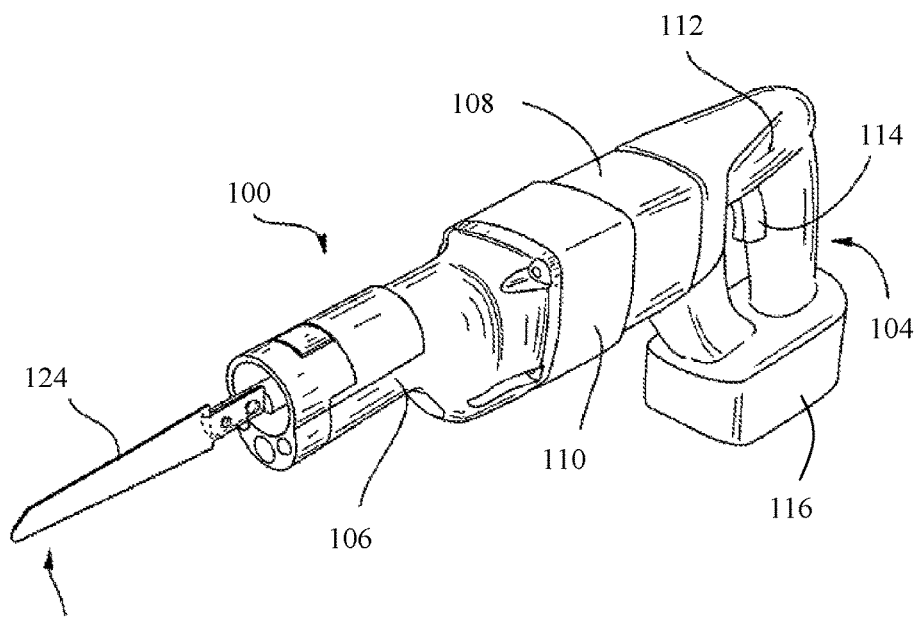
FIG. 1 depicts a side perspective view of a reciprocating tool in accordance with principles of the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

FIG. 1 depicts a reciprocating saw 100 including a working end 102 and a non-working end 104. A front housing 106 is located adjacent the working end 102 in between the working end 102 and a rear housing 108. A middle housing, or bearing plate 110, is located in between the front housing 106 and the rear housing 108. A guide member or foot (not shown) is provided in some embodiments at the working end 102 of the saw 100.

A handle 112 is provided at a rear portion of the rear housing 108. In some embodiments the handle 112 has a generally D-shaped configuration. According to other exemplary embodiments, the handle 112 has different configurations. An on/off switch is preferably located on or near the handle 112 of the reciprocating saw 100. For instance, as shown in FIG. 1, a trigger switch 114 is located on an interior surface of the handle 112. In other embodiments, the on/off switch is located elsewhere on the handle 112 or elsewhere on the reciprocating saw 100. The saw 100 is powered by a battery 116. In some embodiments the saw 100 is plugged into a standard wall outlet.

Figure 2:
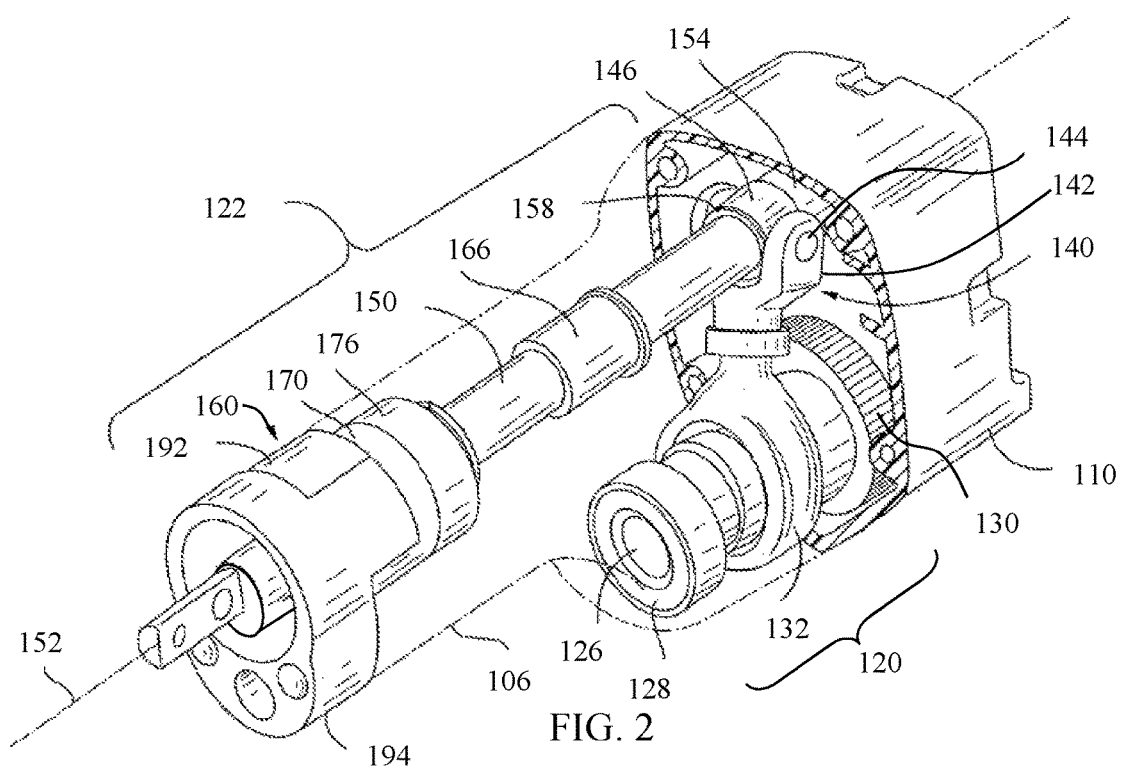
FIG. 2 depicts a partial side perspective view of the tool of FIG. 1 with the housing removed to show the drive assembly and the spindle assembly.

Referring to FIG. 2, the reciprocating saw 100 includes a drive assembly 120 and a spindle assembly 122. Both the drive assembly 120 and the spindle assembly 122 are located in the front housing 106 between the working end 102 of the reciprocating saw 100 and the bearing plate 110 of the reciprocating saw 100. The drive assembly 120 in cooperation with the spindle assembly 122 converts rotary motion from a motor (not shown) to reciprocating motion for a saw blade 124 (see FIG. 1). The spindle assembly 122 allows the blade 124 to rotate about the axis of the spindle independent of the front housing 106 as will be discussed in further detail below.

The drive assembly 120 includes a shaft shown as a drive shaft 126 having a first bearing 128 located at a first end of the drive shaft 126 and a second bearing (not shown) located at a second end of the drive shaft 126. The drive shaft 126 further includes a drive gear 130 located adjacent the second end of the drive shaft 126 which is matingly engaged with a pinion gear (not shown) that is coupled to the motor (not shown). Rotary motion of the motor is transmitted via the pinion gear to the drive gear 130, from the drive gear 130 to the drive shaft 126, and from the drive shaft 126 to a motion conversion device shown as a wobble 132. The rotary motion is converted to reciprocating motion via the internal configuration of the wobble 132 that is attached to an eccentric portion of the drive shaft 126.

Attached to an upper portion of the wobble 132 is a drive means or mechanism 140. The drive means or mechanism 140 is configured to transfer reciprocating motion to a shaft in order to drive the shaft in a reciprocating motion. The drive means or mechanism 140 in this embodiment is also configured to allow the reciprocating shaft to rotate about the axis of the shaft while the shaft is reciprocating.

The drive means or mechanism 140 includes a drive fork 142 that is generally Y-shaped and includes a first end or portion that is coupled to the upper portion of the wobble 132 and a pair of spaced apart arms. The drive fork 142 is attached by pins 144 to a drive bushing 146 which is generally a cylindrical shaped member having an internal bore configured to receive a shaft of the spindle assembly 122 and an external diameter configured to be received in the arms of the drive fork 142. The drive bushing 146 has multiple apertures 148 (see FIG. 3) in the sides of the bushing 146 that are in alignment with apertures in the arms of the drive fork 142 to receive the pins 144. The pins 144 extend no further than the internal bore of the drive bushing 146 and do not contact or lock the shaft 150 to the drive bushing 146.

Figure 3:
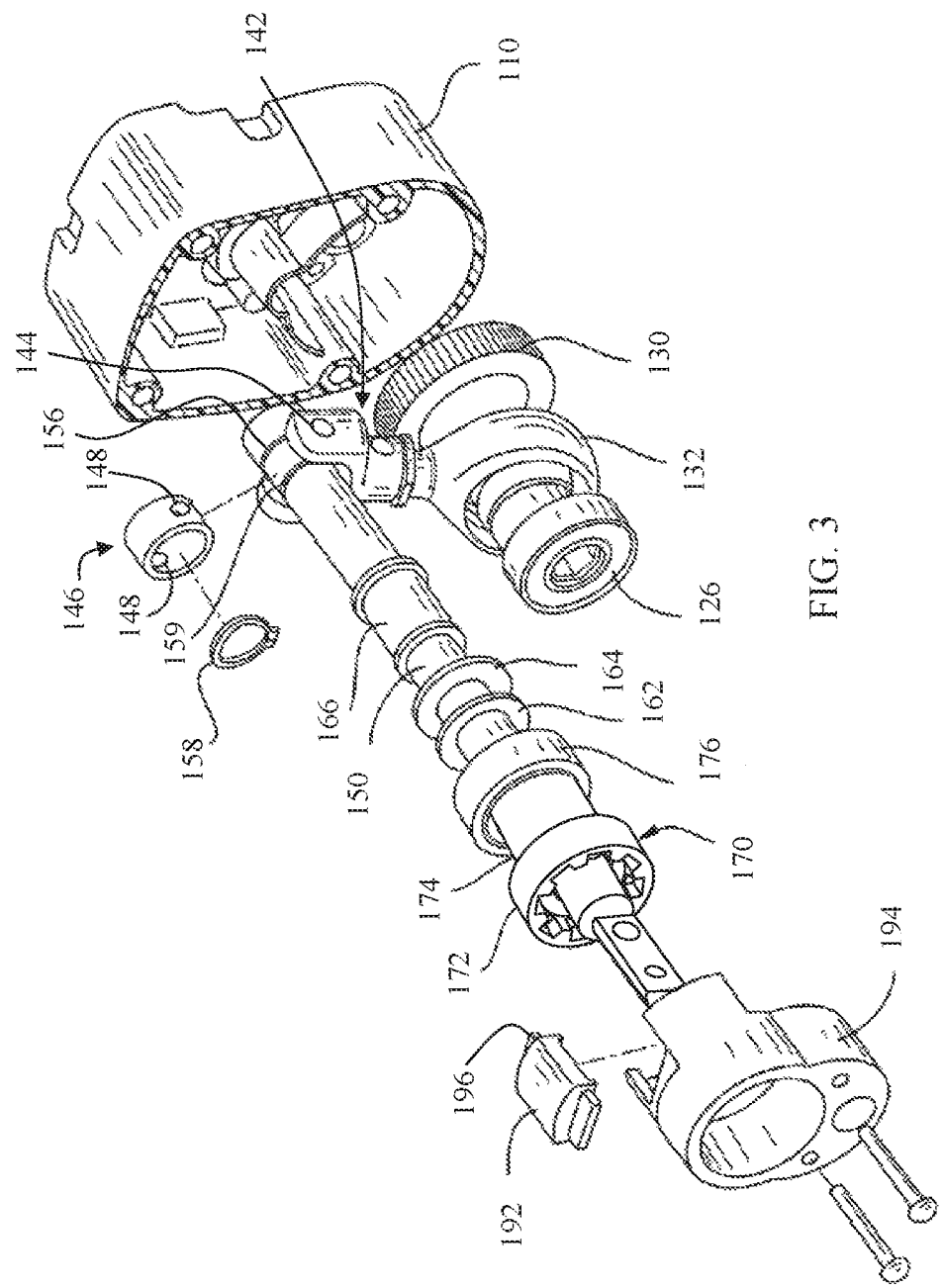
FIG. 3 depicts a partial side exploded perspective view of the tool of FIG. 1 with the housing removed to show the drive assembly and the spindle assembly.

With continued reference to FIGS. 2 and 3, the spindle assembly 122 includes a spindle shaft 150 having a longitudinal axis 152. One end of the spindle shaft 150 is received inside the drive bushing 146. A raised diameter portion 154 is provided at one end of the spindle shaft 150. When the spindle shaft 150 is inserted in the drive bushing 146, a shoulder or edge 156 of the raised diameter portion 154 of the spindle shaft 150 contacts one side of the drive bushing 146 and couples lateral movement of the drive mechanism 140 to the spindle shaft 150 in a first direction or rearward direction. A member shown as a retaining clip 158 is provided (e.g., in a groove 159) on the opposite side of the drive bushing 146 to couple lateral movement of the drive mechanism 140 to the spindle shaft 150 in a second direction or forward direction.

In another embodiment, the drive bushing 146 is laterally coupled to the spindle shaft 150 by two members or retaining clips 158 (e.g., one retaining clip 158 on each side of the drive bushing 146). In yet another alternative embodiment, the raised diameter portion 154 of the spindle shaft 150 is reversed with the member or retaining clip 158 (e.g., a raised portion 154 restrains the front side of the drive bushing 146 and the retaining clip 158 restrains the rear side of the drive bushing 146).

In operation, as the wobble 132 converts rotary motion of the drive shaft 126 to reciprocating motion, the drive fork 142 transmits the reciprocating motion to the drive bushing 146. The drive bushing 146 cooperates with the spindle shaft 150 to reciprocate with respect to the front housing 106. However, as mentioned above, the pins 144 that couple the drive bushing 146 to the drive fork 142 do not extend sufficiently beyond to the inside diameter of the drive bushing 146 to make contact with the spindle shaft 150. Therefore, the spindle shaft 150 is rotationally free within the drive bushing 146 and the spindle shaft 150 is able to rotate inside the drive bushing 146.

The spindle assembly 122 includes a locking means or assembly 160. The locking assembly 160 is configured to selectively lock and unlock the spindle assembly 122 in a rotational manner, thereby allowing the spindle assembly 122 to rotate substantially about the longitudinal axis 152 of the spindle shaft 150 independently of the front housing 106. For example, when the locking assembly 160 is locked, the spindle assembly 122 is able to reciprocate substantially along the longitudinal axis 152, but remains substantially fixed rotationally with respect to the longitudinal axis 152 of the spindle shaft 150. When the locking assembly 160 is unlocked, the spindle assembly 122 is able to reciprocate substantially along and rotate substantially about the longitudinal axis 152 of the spindle shaft 150. Rotation of the spindle assembly 122 is discussed in further detail below.

The spindle assembly 122 also includes a dust retention assembly shown as a steel washer 162 and a felt washer 164 located on the spindle shaft 150 between the working end and the driven end of the spindle shaft 150. These washers aid in preventing dust and debris from entering the interior of the front housing 106. In some embodiments, the dust retention assembly is another suitable device and/or is located elsewhere on the reciprocating saw.

The spindle assembly 122 in some embodiments includes a bushing shown as a back spindle bushing 166 to aid in the support of the spindle shaft 150 during the substantially reciprocating motion and the substantially rotary motion of the shaft 150, although as discussed below this bushing in some embodiments is omitted. The back spindle bushing 166 is received by the front housing 106 (e.g., pressed into the front housing) and remains in a fixed position with respect to the spindle shaft 150 which reciprocates back and forth through the interior diameter of the back spindle bushing 166. The back spindle bushing 166 also remains in a fixed position with respect to the spindle shaft 150 when the spindle shaft 150 rotates in the interior diameter of the back spindle bushing 166.

The locking assembly 160 includes a locking bushing 170 that is provided adjacent the first end of the spindle shaft 150. The locking bushing 170 has a first external diameter 172 configured to be received inside the front housing 106 and a second external diameter 174 configured to cooperate with a bearing 176. In one embodiment, the bearing 176 is a thin wall bearing. The bearing 176 is pressed onto the second external diameter 174 of the locking bushing 170. The bearing 176 is then pressed into the front housing 106. The first external diameter 172 of the locking bushing 170 is configured to be slightly smaller than the external diameter of the bearing 176 so that when the bearing 176 is pressed into the front housing 106, there is a predetermined amount of clearance between the first external diameter 172 of the locking bushing 170 and the front housing 106.

Figure 4:
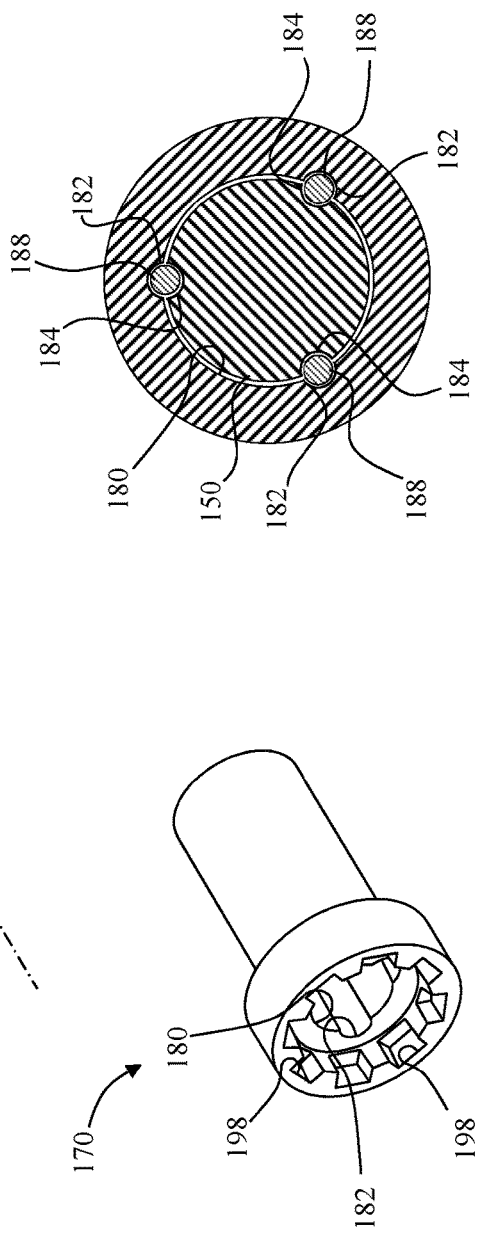
FIG. 4 depicts a side perspective view of the locking bushing of FIG. 3.

Referring to FIG. 4, the locking bushing 170 includes an internal bore 180 (see also FIG. 6) configured to be slidably coupled with the spindle shaft 150. The internal bore 180 is configured so that the spindle shaft 150 may reciprocate within the locking bushing 170 without movement of the locking bushing 170. In addition, the internal bore 180 includes a plurality of grooves 182. The grooves 182 are used to rotationally couple the locking bushing 170 and the spindle shaft 150.

Figure 5:
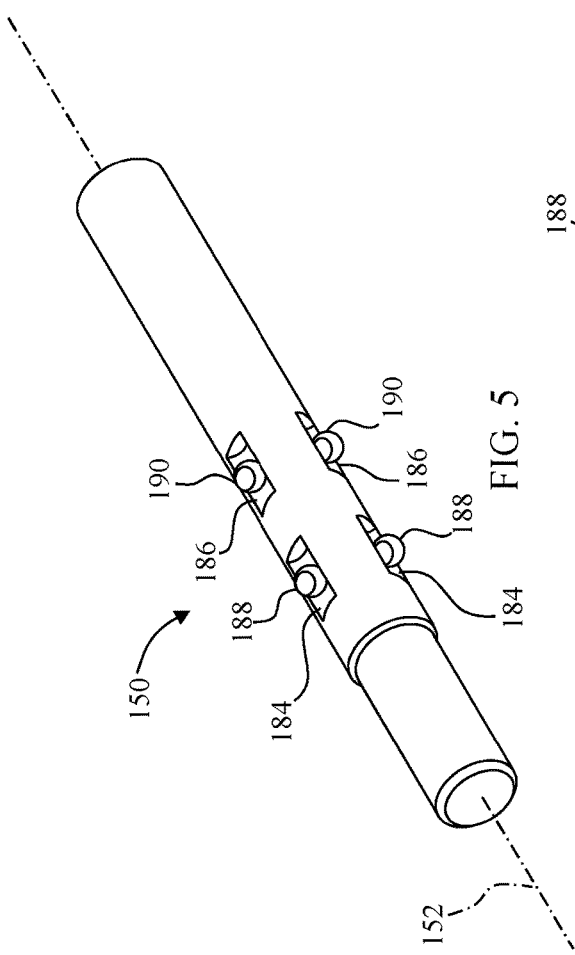
FIG. 5 depicts a side perspective view of the spindle shaft of FIG. 4.

Specifically, as depicted in FIG. 5 the spindle shaft 150 includes a plurality of forward grooves 184. The spindle shaft 150 in this embodiment further includes a plurality of rearward grooves 186. Each of the plurality of rearward grooves 186 is aligned with one of the forward grooves 184 along the longitudinal axis 152 of the spindle shaft 150.

Figure 6:
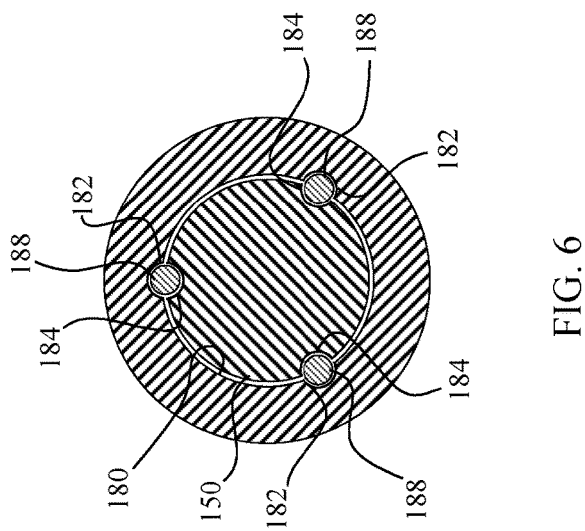
FIG. 6 depicts a cross sectional view of the spindle shaft positioned within the locking bushing.

When assembled, ball bearings 188 are placed within each of the forward grooves 184 while ball bearings 190 are placed in each of the rearward grooves 186. Additionally, each of the ball bearings 188 and 190 are positioned within one of the grooves 182 as depicted in FIG. 6. Accordingly, any rotational forces on either the spindle shaft 150 or the locking bushing 170 are directly transferred to the other of the spindle shaft 150 or the locking bushing 170. Thus, when the locking bushing 170 rotates, so does the spindle shaft 150 and vice versa.

Accordingly, when the bearing 176 is fixed (press fit) in the front housing 106, the locking bushing 170 provides anti-rotation of the spindle shaft 150. In embodiments including a wobble driven mechanism such as the wobble 132, the wobble does not need additional features for anti-rotation. Consequently, the wobble driven mechanism will run smoother as there will be less forces to keep the spindle shaft 150 from rotating.

Moreover, because the forward grooves 184 are axially offset from the rearward grooves 186, the locking bushing provides axial stability. To provide the desired stability, three spaced apart grooves are preferred although more can be used. Preferably, the grooves are equally spaced apart. Thus, in embodiments incorporating three grooves the grooves are preferentially spaced 120 degrees apart. Consequently, the rear bushing 166 may be omitted without adversely affecting the operation of the reciprocating saw 100. Alternatively, the rearward grooves 186 and the associated ball bearings 190 may be omitted in embodiments including a rear bushing 166 since axial stability is provided by the rear bushing 166. Additionally, while the embodiment of FIG. 5 includes grooves provided in two axial rows (forward grooves 184 and rearward grooves 186), additional rows are provided in other embodiments. In the other embodiments, at least some of the grooves in the rearward rows are not aligned with grooves in the forward row.

Returning to FIGS. 2 and 3, the locking assembly 160 also includes a locking mechanism (device, member, slider, switch, etc.) shown as a locking button 192. The locking button 192 is received and retained by a front housing cover 194 but may be located elsewhere. The locking button 192 is rotationally fixed with respect to the front housing cover 194 and the front housing 106. The locking button 192 includes a tab 196 which is configured to slidingly engage splines 198 (see FIG. 4) provided in the locking bushing 170. A spring (not shown) or other biasing mechanism is provided in the locking mechanism 160 in some embodiments to bias the locking button 192 radially outwardly from the spindle shaft 150.

Accordingly, when the locking button 192 is moved to a radially outwardly position, the tab 196 is forced into engagement with one of the splines 198. Consequently, the locking bushing 170 is rotationally fixed with respect to the front housing 106 through the locking button 192. Because the ball bearings 188 and 190 are engaged with the grooves 184/186 of the spindle shaft 150 and the grooves 182 of the locking bushing 170, the spindle shaft 150 is also rotationally fixed with respect to the front housing 106. The spindle is still allowed, however, to reciprocate with respect to the front housing 106.

A number of splines 198 are provided to allow for multiple locking positions. The splines 198 in this embodiment are equally spaced about the radial axis of the locking bushing 170. As shown in FIG. 4, eight (8) splines 198 are provided which provides locking positions that are located at every 45° (e.g., 0°, 45°, 90°, 135°, 180°, etc.) about the radial axis of the locking bushing 170. In another embodiment, the locking bushing 170 is provided with a different number of splines. In some embodiments, the locking bushing 170 is provided with more or less splines 198 that are equally or unequally spaced about the radial axis.

When the locking button 192 is pushed to a radially inwardly position, the tab 196 is moved out of engagement with the splines 198 and the locking bushing 170 is rotatable with respect to the front housing 106 because of the bearing 176. Moreover, because the ball bearings 188 and 190 are engaged with the grooves 184/186 and the grooves 182, rotation of the locking bushing 170 causes rotation of the spindle shaft 150 with respect to the front housing 106. Even while rotating, the spindle shaft 150 is still allowed to reciprocate with respect to the front housing 106. This "free rotation" setting of the spindle shaft 150 allows for scroll cutting (scrolling) while using the reciprocating saw 100.

While the embodiment shown includes a locking button which is radially movable, in some embodiments, the locking mechanism is movable along the longitudinal axis 152. In these embodiments, the locking mechanism is biased rearwardly to force engagement of the tab 196 with the splines 198.

In the embodiment of FIG. 1, the locking bushing 170 and spindle shaft 150 are depicted in a reciprocating saw 100 which allows for rotation of the spindle shaft 150 during operation. The locking bushing 170 and spindle shaft 150 are further useful in embodiments wherein the locking bushing 170 and spindle shaft 150 are permanently rotationally locked with the housing. Permanent rotational locking of the locking bushing 170 and spindle shaft 150 in some embodiments is accomplished by press-fitting the locking bushing directly to the housing. In these embodiments, there is no need for the splines 198, and the locking bushing can be configured as a single outer diameter bushing. If desired, two identically configured locking bushings may be provided which are axially spaced apart, each bushing with a single row of grooves. Alternatively, a single locking bushing with a spaced apart regular bushing can be used. In permanently rotationally locked embodiments the groove and ball bearing arrangement described above thus provide axial stability in the same manner as the rotatable spindle shaft embodiments.

In some permanently rotationally locked embodiments, the pins 144 extend into the spindle shaft 150. In other embodiments, a single pin is used which extends completely through the spindle shaft 150.

Because the locking bushing 170 is thus configured to prevent rotation of the spindle shaft 150 in both selectively rotatable and permanently non-rotatable embodiments, there is no need to provide anti-rotation features for the wobble. Accordingly, a significant reduction in materials is realized resulting in reduced weight and reduced costs. Additionally, there is less wear on the wobble and associated components.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected. Moreover, those of ordinary skill in the art will recognize that features of the various embodiments can be combined with features of other embodiments in accordance with principles of the disclosure.

The invention claimed is:

1. A reciprocating saw, comprising:
   a housing;
   a spindle shaft configured to reciprocate within the housing, the spindle shaft including a plurality of first grooves extending along an axis of the spindle shaft;
   a saw blade mountable to an end of the spindle shaft to extend outside the housing and reciprocate with the spindle shaft;
   a locking bushing including an internal bore, the locking bushing supported by the housing such that the plurality of first grooves is at least partially located within the internal bore, the locking bushing including a plurality of axially extending grooves within the internal bore, each of the plurality of axially extending grooves aligned with a respective one of the plurality of first grooves; and
   a plurality of first ball bearings, each of the plurality of first ball bearings positioned at least partially within a respective one of the plurality of axially extending grooves and the aligned respective one of the plurality of first grooves.

2. The saw of claim 1, wherein the spindle shaft is selectively rotatable within the housing.

3. The saw of claim 2, further comprising:
   a locking mechanism including an axially extending tab and rotationally fixed with respect to the housing, the locking mechanism movable between a first position whereat the locking mechanism engages the locking bushing to preclude rotation of the locking bushing, and a second position whereat the locking mechanism does not preclude rotation of the locking bushing.

4. The saw of claim 3, wherein:
the locking bushing includes a plurality of splines, each of the plurality splines alternatively alignable with the tab such that the tab can engage each of the plurality splines at a rotational position of the spindle shaft different from a rotational position of the spindle shaft at which the tab engages each of the other of the plurality of splines.

5. The saw of claim 4, wherein the locking mechanism comprises:
a button rotationally fixed with respect to the housing and movable between a third position and a fourth position, the fourth position radially outwardly of the first position, wherein the tab extends rearwardly from a body portion of the button.

6. The saw of claim 3, further comprising:
a plurality of second grooves in the spindle shaft extending along the axis of the spindle shaft, each of the plurality of second grooves aligned with a respective one of the axially extending grooves; and
a plurality of second ball bearings, each of the plurality of second ball bearings positioned at least partially within a respective one of the plurality of axially extending grooves and the aligned respective one of the plurality of second grooves.

7. The saw of claim 6, wherein each of the plurality of second grooves is aligned with a respective one of the plurality of first grooves.

8. The saw of claim 1, further comprising:
a plurality of second grooves in the spindle shaft extending along the axis of the spindle shaft, each of the plurality of second grooves aligned with a respective one of the axially extending grooves; and
a plurality of second ball bearings, each of the plurality of second ball bearings positioned at least partially within a respective one of the plurality of axially extending grooves and the aligned respective one of the plurality of second grooves.

9. The saw of claim 8, wherein each of the plurality of second grooves is aligned with a respective one of the plurality of first grooves.

10. The saw of claim 9, wherein the spindle shaft is selectively rotatable within the housing.

11. A method of operating a reciprocating saw, comprising:
reciprocating a saw blade mounted to a spindle shaft, the spindle shaft having at least a portion within a housing; and
guiding the reciprocating spindle shaft with a first plurality of ball bearings, each of the first plurality of ball bearings positioned at least partially within (i) a respective one of a plurality of axially extending grooves in a locking bushing, and (ii) a respective one of a plurality of first grooves extending along an axis of the spindle shaft.

12. The method of claim 11, further comprising:
selectively rotating the spindle shaft within the housing.

13. The method of claim 12, wherein selectively rotating the spindle shaft within the housing comprises:
rotating the locking bushing with respect to the housing; and
transferring rotational force from the locking bushing to the spindle shaft through the first plurality of ball bearings.

14. The method of claim 13, further comprising:
moving a locking mechanism including an axially extending tab and rotationally fixed with respect to the housing, from a first position whereat the locking mechanism engages the locking bushing to preclude rotation of the locking bushing, to a second position whereat the locking mechanism does not preclude rotation of the locking bushing prior to selectively rotating the spindle shaft.

15. The method of claim 14, further comprising:
aligning one of a plurality of splines of the locking bushing with the axially extending tab of the locking mechanism by the selective rotation of the spindle shaft; and
moving the locking mechanism from the second position to the first position.

16. The method of claim 15, wherein moving the locking mechanism from the second position to the first position comprises:
moving a button rotationally fixed with respect to the housing and movable between a third position and a fourth position, the fourth position radially outwardly of the third position, from the third position to the fourth position.

17. The method of claim 13, further comprising:
guiding the reciprocating spindle shaft with a second plurality of ball bearings, each of the second plurality of ball bearings positioned at least partially within (i) a respective one of the plurality of axially extending grooves in the locking bushing, and (ii) a respective one of a plurality of second grooves extending along the axis of the spindle shaft.

18. The method of claim 17, wherein each of the plurality of second grooves is aligned with a respective one of the plurality of first grooves.

19. The method of claim 11, further comprising:
guiding the reciprocating spindle shaft with a second plurality of ball bearings, each of the second plurality of ball bearings positioned at least partially within (i) a respective one of the plurality of axially extending grooves in the locking bushing, and (ii) a respective one of a plurality of second grooves extending along the axis of the spindle shaft.

20. The method of claim 19, wherein each of the plurality of second grooves is aligned with a respective one of the plurality of first grooves.

21. The method of claim 19, further comprising:
preventing rotation of a wobble configured to reciprocate the spindle shaft using the first and second plurality of ball bearings.

* * * * *